Nov. 30, 1926.

T. A. JENSEN

BEARING TRIMMING TOOL

Filed March 26, 1924

WITNESSES

INVENTOR
T.A Jensen

BY

ATTORNEYS

Nov. 30, 1926.

T. A. JENSEN 1,608,659

BEARING TRIMMING TOOL

Filed March 26, 1924     2 Sheets-Sheet 2

WITNESSES

INVENTOR
T. A. Jensen.
BY
ATTORNEYS

Patented Nov. 30, 1926.

1,608,659

UNITED STATES PATENT OFFICE.

TREIDER A. JENSEN, OF INNISFAIL, ALBERTA, CANADA.

BEARING-TRIMMING TOOL.

Application filed March 26, 1924. Serial No. 702,168.

My invention relates to improvements in cutting tools, being more particularly a tool for trimmings shaft bearing babbitts, and it consists of the constructions, combinations and arrangements herein described and claimed.

An object of the invention is to provide a small machine adapted particularly for the purpose of accurately and quickly trimming the ends of Babbitt metal bushings in the bearing caps of automobile engines.

Another object of the invention is to provide a small machine upon which a bearing cap may be placed and by which the ends of the Babbitt metal bushings may be quickly trimmed to the desired size by a few turns of a cutter handle.

Another object of the invention is to provide a machine for the purpose described having a micrometer adjustment which stops the trimming action when the bushing has been cut down to the desired length.

Other objects and advantages of the invention will appear in the following specification, reference being had to the accompanying drawing, in which—

By way of introduction the general purpose of the trimming tool should be understood. The main rear bearing 1 and the bearing cap 2 support the heaviest load, and the cap 2 being underneath (Fig. 1) usually shows the first signs of wear. This wearing of the rear bearing cap 2 is due to the fact that the weight of the fly wheel, a portion of the transmission, the magneto and a large proportion of the piston thrust are all imposed thereon. The resulting looseness in the rear bearing is undesirable, and this defect can be remedied by substituting an oversize bearing cap.

Figures 1, 2, 3:
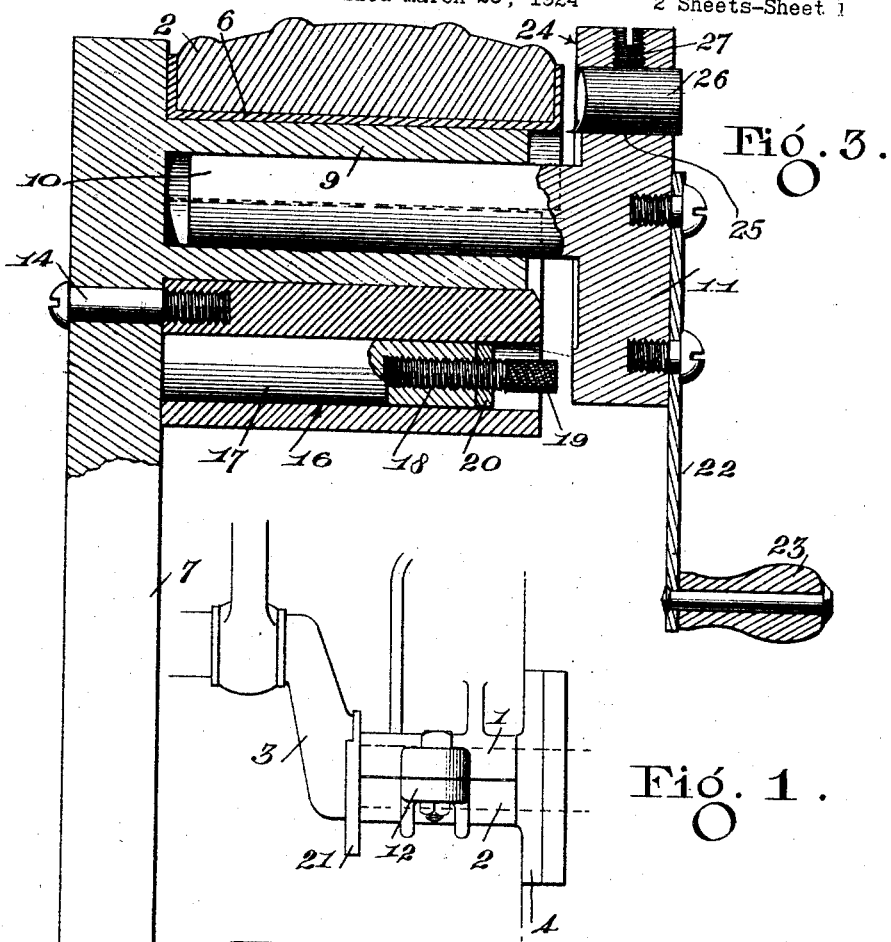
Figure 1 is a side elevation of enough of the rear crank shaft bearing of a Ford automobile to illustrate the bearing caps in respect to which the invention operates.
Figure 2 is a detail perspective view of the bearing cap alone.
Figure 3 is a longitudinal section of the bearing cap trimming tool.

It may be assumed that the bearing cap 2 in Figure 2 is an oversize cap which is to be substituted for a worn one. This cap is oversize in length, and necessarily so in order that it may take up any end play and correctly preserve the spacing between the rear crank 3 and the adjacent magneto flange 4. However, before this oversize cap 2 can be used or put into place, the flanges 5 of the babbitt bushing 6 must be filed away until the cap will correctly fill the space it is intended to occupy.

Usually this cutting or filing is done by hand. This is not only slow work, but is very hard to do accurately. Therefore, the purpose of the invention is to provide a small and readily portable machine upon which the new bearing cap 2 can be mounted, and by which the babbitt flanges 5 can quickly be trimmed down to the exact size.

The trimming tool comprises a stand 7 which has a base 8 which in practice is intended to be screwed upon a work bench. A tubular sleeve 9 at one side of the stand near the top provides both a rest for the bearing cap 2 and a bearing for the mandrel 10 of the cutter head or holder 11. The bolt flanges 12 of the bearing cap 2 are intended to clear the block 13 (Fig. 4) when the bearing cap is seated upon the sleeve 9. The cap is oversize both in depth and length. These caps vary in depth, and as it is not possible to fit the face of the bearing cap until the ends have been fitted, this clearance is necessary to allow for the variation. This causes the bushing 6 to rest on the sleeve 9, preventing side movement of the bearing and insuring a perfect alinement of the edge of the bushing with the cutters.

Two or more screws 14 (Fig. 13) fix the block 13 upon the stand 7. These enter from the rear as shown. Although the tubular sleeve 9 occupies the semi-circular concavity 15 of the block 13 (Fig. 4) both are entirely independent of each other.

The block 13 has a tubular bore 16 in vertical alignment with the concavity 15. This bore constitutes the housing for a micrometer which is composed of a cylindrical stem 17 having a threaded bore 18 at one end to receive the threaded end of a screw 19. This screw is held at various adjustments by means of a jam nut 20. The micrometer is intended to be taken out of the bore 16 for the purpose of measuring the space between the flange 4 (Fig. 1) and the flange 21 of the crank 3. After that it is replaced in the bore 16 and becomes the means by which the trimming of the bearing 2 is accurately accomplished. As intimated before, the cutter head or holder 11 is carried by the mandrel 10. This cutter holder has a crank 22 with a handle 23 by which it is turned. The cutter holder is held upon the tool stand 2 by hand pressure only. It is readily taken off and replaced. On the inner surface it has a circumferential shoulder 24, and situated in the cutter holder beside the shoulder there is a plurality of openings 25 each of which carries a cutter 26. The cutters are held in place in the openings by set screws 27.

The operation may be readily understood from the following description. Assume that the old bearing cap 2 (Fig. 1) as well as the flanges 4 and 21 of the crank shaft have become worn. The old cap must be replaced by a new one which must first be trimmed before it will fit. This trimming is necessary because an oversize bearing cap must be used. The trimming is done on the end flanges 5 of the babbitt bushing 6.

The first step is to take the micrometer 17 out of the circular bore 16 of the tool stand 7 and insert it in the space between the flanges 4 and 21. The jam nut 20 is first loosened, whereupon the screw 19 may be worked out or in until the micrometer fits the space mentioned. The jam nut is then reseated, and the micrometer is replaced in the bore 16 of the trimming stand.

Figure 4:
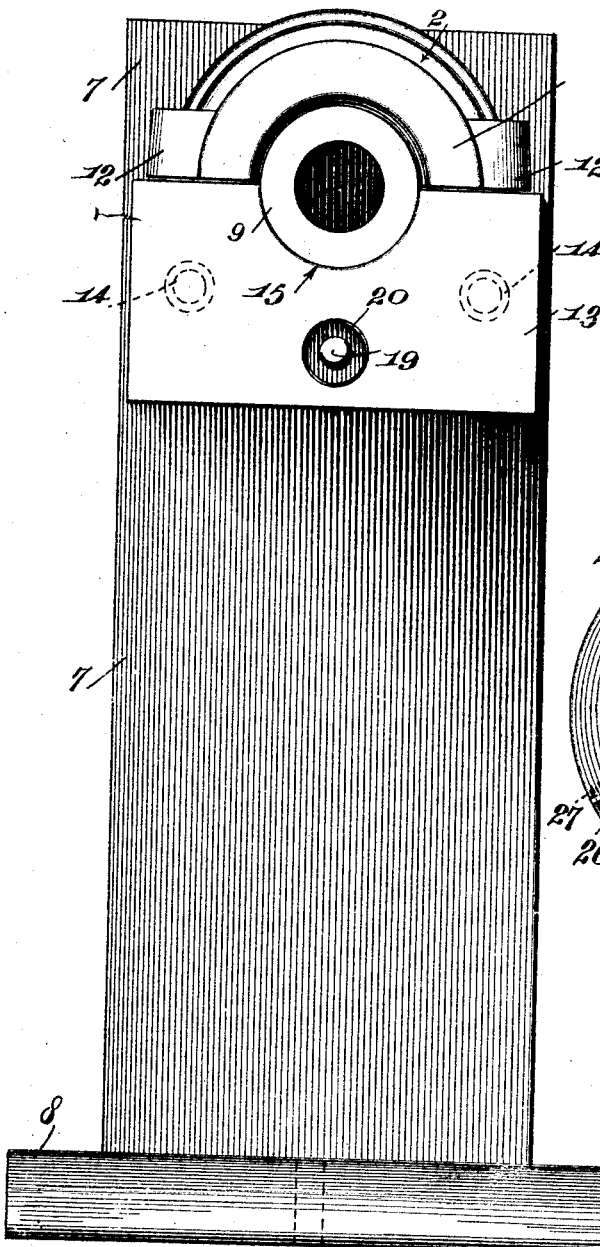
Figure 4 is a front elevation of the tool stand.
Figure 5:
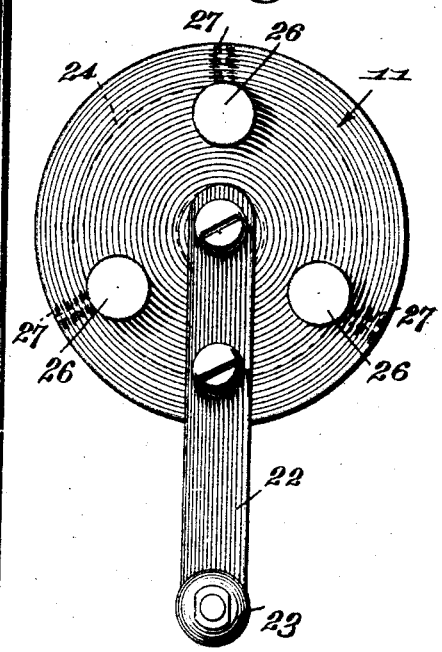
Figure 5 is a front elevation of the rotary cutter head.

The new, oversized bearing cap 2 is placed upon the stand as shown in Figure 4. The bolt flanges 12 rest on the block 13 and the tubular sleeve 9 on the stand occupies the hollow place in the bushing 6 which will ultimately be occupied by the crank shaft. The bearing 2 is held in place by one hand. The mandrel 10 of the cutter holder 11 is inserted in the tubular sleeve, and the crank 22 is given a few turns with the other hand. The cutters 26 are of such design that they will properly space the flanges 5 as well as chamfer the inner edge of the babbitt bushing.

Rotation of the cutter holder continues until the circumferential shoulder 24 meets the micrometer screw 17. This limits the inward movement of both cutter holder and cutters so that the cutting or trimming operation must stop.

It is to be observed that the cutters 26 come out even with the circumferential shoulder 24, and all three cutters may be fit exactly alike by first removing the micrometer 17 and the bearing cap 2 and thereupon slipping the cutter holder inward and turning it until each cutter in turn comes up against the shoulder of the block 13. The reader will see that the block 13 extends out a little farther than the tubular sleeve 9, thereby providing a shoulder against which the cutters may be set. This shoulder acts as a gauge for the setting of the cutters. The cutters are fixed in place by the set screws 27.

While the construction and arrangement of the improved bearing trimming tool as herein described and claimed is that of a generally preferred form, obviously modifications and changes may be made without departing from the spirit of the invention or the scope of the claims.

I claim:

1. A tool for the purpose described comprising a stand having a cylindrical sleeve, a block having a concavity to receive the sleeve, the two providing a support upon which a bearing cap may be held; a holder having a plurality of openings, a cutter fixed in each of the openings, a mandrel on the holder revoluble in said sleeve, a crank handle on the holder by which it is turned and the cutters are held against a bushing in the cap to trim the bushing, and a loose micrometer carried by the block but which is adjusted before mounting on the block to be engaged by the holder after a number of turns to limit the trimming action of the cutters.

2. A tool for the purpose described comprising a stand having a block with a top concavity and a bore, a tubular sleeve on the stand occupying said concavity, the sleeve and block providing a support for the bearing cap in an inverted position; a holder having an integral mandrel which is insertable into the sleeve, a crank handle on the holder by which it is turned, a plurality of cutters carried by the holder to trim the end of a bushing in the cap, and a micrometer situated in the bore of the block against which the holder rests after a number of turns to stop the trimming action of the cutters, said micrometer being composed of a stem, a screw which is previously adjusted in respect to the stem, and means to fix the adjustments of the screw.

3. A tool for the purpose described comprising a stand having a tubular sleeve and a block upon which a bearing cap is supported, a holder having a circumferential shoulder and a plurality of cutters situated inwardly thereof with the cutting edges flush with the shoulder, a mandrel carried by the holder which is revoluble in the sleeve so that the cutters may trim the end of a bushing in the cap, a crank handle on the holder by which it is turned, and means serving the purpose of a micrometer carried by the block against which said shoulder rubs after a number of turns of the holder to stop the trimming action of the cutters.

4. A tool for the purpose described comprising a stand having an integral tubular sleeve, a block affixed to the stand extending a little beyond the end of the sleeve, a cutter holder having a mandrel insertable in the sleeve and a circumferential shoulder on the holder which may contact with the block, cutters carried by the holder which are engageable with the block to gauge the position of the cutters and means carried by the holder to set the adjusted positions of the cutters.

TREIDER A. JENSEN.